United States Patent
Fujishiro

(10) Patent No.: US 10,356,835 B2
(45) Date of Patent: Jul. 16, 2019

(54) COMMUNICATION CONTROL APPARATUS AND BASE STATION

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 58 days.

(21) Appl. No.: 15/547,572

(22) PCT Filed: Feb. 5, 2016

(86) PCT No.: PCT/JP2016/053477
§ 371 (c)(1),
(2) Date: Jul. 31, 2017

(87) PCT Pub. No.: WO2016/125886
PCT Pub. Date: Aug. 11, 2016

(65) Prior Publication Data
US 2018/0007730 A1    Jan. 4, 2018

Related U.S. Application Data

(60) Provisional application No. 62/112,764, filed on Feb. 6, 2015.

(51) Int. Cl.
*H04W 76/19* (2018.01)
*H04W 76/10* (2018.01)
(Continued)

(52) U.S. Cl.
CPC ........... *H04W 76/19* (2018.02); *H04L 5/0032* (2013.01); *H04W 16/14* (2013.01); *H04W 16/32* (2013.01);
(Continued)

(58) Field of Classification Search
CPC .... H04L 5/0032; H04W 16/14; H04W 16/32; H04W 36/0027; H04W 68/00;
(Continued)

(56) References Cited

U.S. PATENT DOCUMENTS

2014/0334371 A1* 11/2014 Kim .................. H04W 52/0206
370/311
2015/0172963 A1* 6/2015 Kim .................. H04W 36/0027
370/332
(Continued)

FOREIGN PATENT DOCUMENTS

WO       2014/085622 A1    6/2014

OTHER PUBLICATIONS

Huawei: Discussion of SAE Bearer Identifier; C1-071071; May 7-11, 2007; 3 pages; 3GPP TSG CT WG1 Meeting #47; Beijing, China.
(Continued)

*Primary Examiner* — Charles C Jiang
*Assistant Examiner* — Rosene Clark
(74) *Attorney, Agent, or Firm* — Studebaker & Brackett PC

(57) ABSTRACT

A communication control apparatus according to a first feature is used in a mobile communication system. The communication control apparatus includes: a controller configured to perform control related to a radio access bearer established between a user terminal and a serving gateway. The radio access bearer is configured with: a first bearer between the user terminal and a base station; and a second bearer between the base station and the serving gateway. The communication control apparatus is positioned on the second bearer. The controller is configured to maintain at least some sections of the second bearer without releasing, even when the first bearer is released.

8 Claims, 6 Drawing Sheets

(51) Int. Cl.
*H04W 76/20* (2018.01)
*H04W 16/32* (2009.01)
*H04W 68/00* (2009.01)
*H04W 88/18* (2009.01)
*H04W 92/12* (2009.01)
*H04W 76/30* (2018.01)
*H04W 16/14* (2009.01)
*H04W 72/04* (2009.01)
*H04W 72/08* (2009.01)
*H04W 76/15* (2018.01)
*H04L 5/00* (2006.01)
*H04W 36/00* (2009.01)
*H04W 88/08* (2009.01)

(52) U.S. Cl.
CPC ....... *H04W 36/0027* (2013.01); *H04W 68/00* (2013.01); *H04W 72/042* (2013.01); *H04W 72/0446* (2013.01); *H04W 72/082* (2013.01); *H04W 76/10* (2018.02); *H04W 76/15* (2018.02); *H04W 76/20* (2018.02); *H04W 76/30* (2018.02); *H04W 88/18* (2013.01); *H04W 92/12* (2013.01); *H04W 88/08* (2013.01)

(58) Field of Classification Search
CPC ........... H04W 72/042; H04W 72/0446; H04W 72/082; H04W 76/10; H04W 76/15; H04W 76/19; H04W 76/20; H04W 76/30; H04W 88/08; H04W 88/18; H04W 92/12; H04W 76/34; H04W 76/11; H04W 76/12; H04W 76/22; H04W 76/25; H04W 76/32; H04W 88/16
See application file for complete search history.

(56) References Cited

U.S. PATENT DOCUMENTS

2015/0264580 A1* 9/2015 Iwai ................... H04W 76/12
 370/329
2015/0312950 A1* 10/2015 Cartmell ............... H04W 76/38
 370/329

OTHER PUBLICATIONS

International Search Report issued in PCT/JP2016/053477; dated Apr. 19, 2016.
Huawei et al.; New Study Item Proposal: Study on further enhancements of small Cell high layer aspects for LTE; 3GPP TSG RAN Meeting #66; RP-142283; Dec. 8-11, 2014; pp. 1-7; Maui, Hawaii, USA.

* cited by examiner

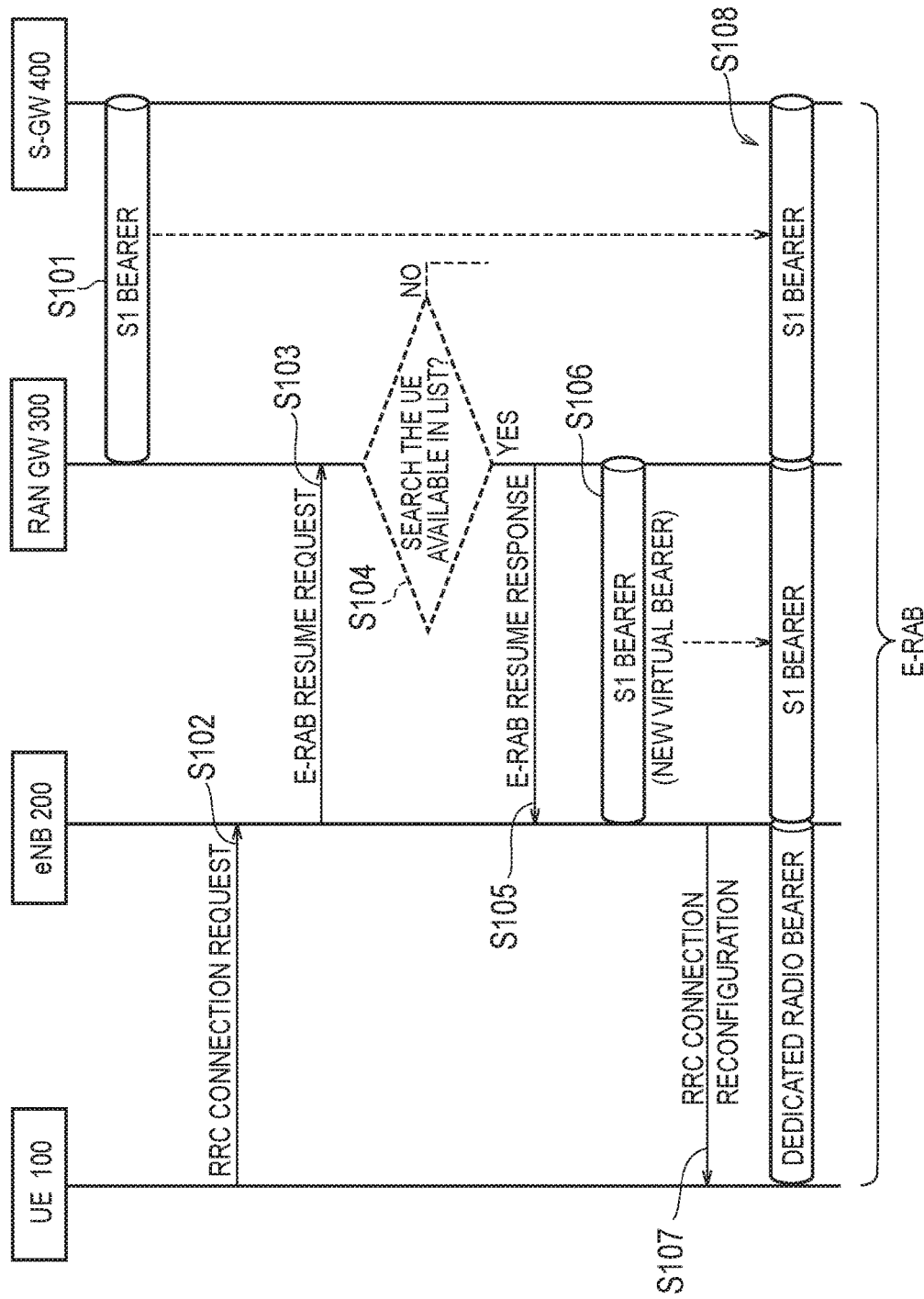

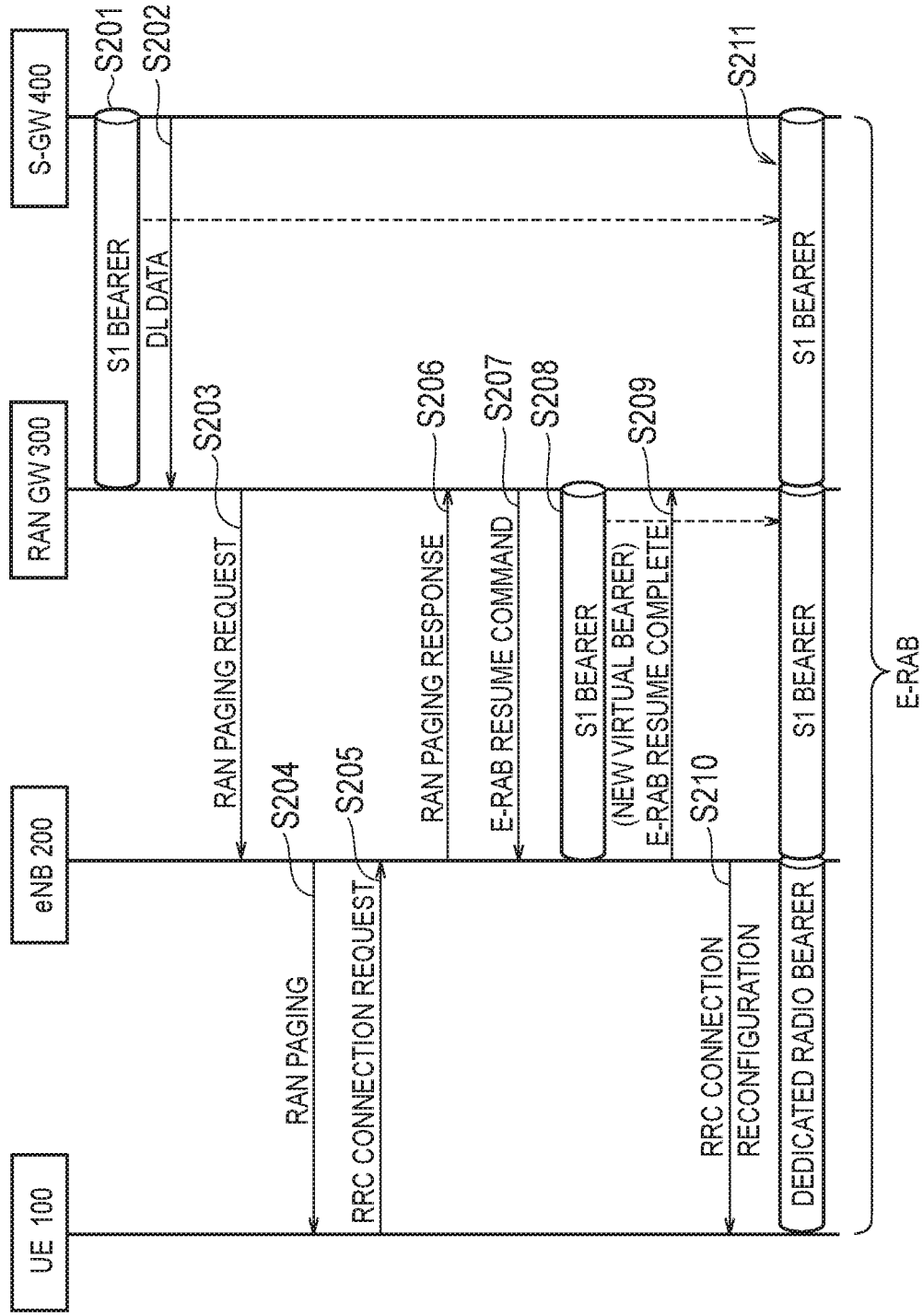

COMMUNICATION CONTROL APPARATUS AND BASE STATION

CROSS REFERENCE

This application claims the benefit of U.S. provisional application No. 62/112,764 filed Feb. 6, 2015, the entire contents of which are incorporated herein by reference.

TECHNICAL FIELD

The present application relates to a communication control apparatus and a base station used in a mobile communication system.

BACKGROUND ART

In recent years, in a 3rd Generation Partnership Project (3GPP) which is a mobile communication system standardization project, a technique of arranging small cells (a small cell base station) in a macro cell and increasing a system capacity through the small cells in order to respond to a rapidly increasing traffic demand is under review.

On the other hand, since a large number of small cell base stations are included in a radio access network, signaling from the radio access network to a core network (specifically, a mobility management apparatus) increases.

Therefore, there is a problem in that a processing load in the mobility management apparatus is increased due to a large number of small cell base stations. Particularly, when a user terminal performs a handover frequently, such a problem becomes remarkable (for example, see Non Patent Literature 1).

CITATION LIST

Non Patent Literature

Non Patent Literature 1: 3GPP Contribution "RP-142283," December, 2014

SUMMARY OF INVENTION

A communication control apparatus according to a first feature is used in a mobile communication system. The communication control apparatus includes: a controller configured to perform control related to a radio access bearer established between a user terminal and a serving gateway. The radio access bearer is configured with: a first bearer between the user terminal and a base station; and a second bearer between the base station and the serving gateway. The communication control apparatus is positioned on the second bearer. The controller is configured to maintain at least some sections of the second bearer without releasing, even when the first bearer is released.

A base station according to a second feature is used in a mobile communication system. The base station includes a controller configured to perform control related to a radio access bearer established between the user terminal and a serving gateway. The radio access bearer is configured with: a first bearer between the user terminal and the base station; and a second bearer between the base station and the serving gateway. A communication control apparatus is positioned on the second bearer. The controller is configured to transmit a bearer re-establishment request to the communication control apparatus when a connection request is received from the user terminal after the first bearer is released.

BRIEF DESCRIPTION OF DRAWINGS

FIG. 5 is a sequence diagram illustrating a first bearer re-establishment sequence according to the embodiment.

FIG. 6 is a sequence diagram illustrating a second bearer re-establishment sequence according to the embodiment.

DESCRIPTION OF EMBODIMENTS

Overview of Embodiment

Figure 1:
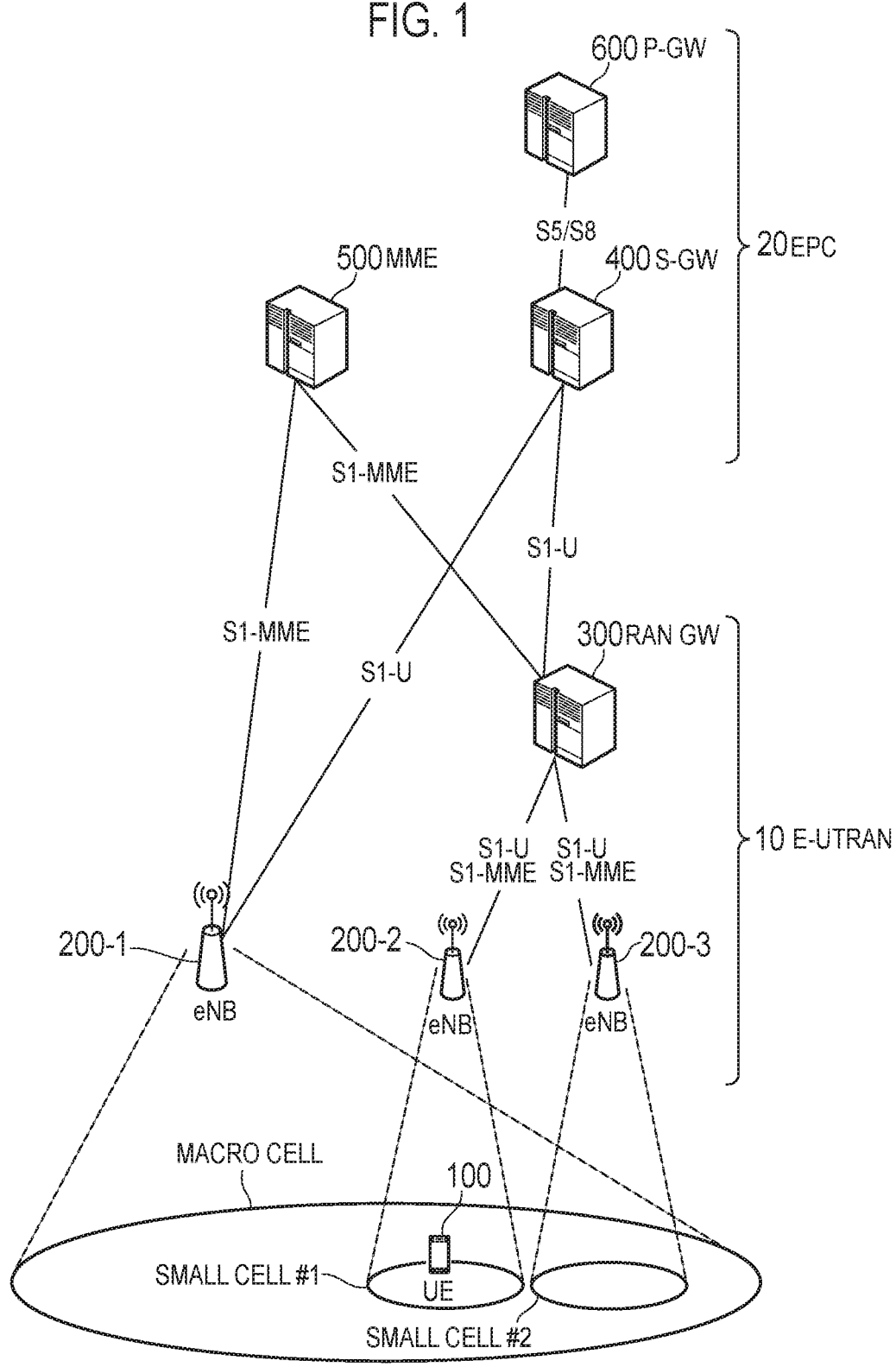
FIG. 1 is a diagram illustrating a configuration of a mobile communication system (an LTE system) according to an embodiment.

When a user terminal releases a connection with a base station, a radio access bearer between the user terminal and a serving gateway is also released.

Then, when the user terminal establishes a connection with the base station, signaling occurs between the base station and the mobility management apparatus in order to establish the radio access bearer.

A processing load associated with the establishment of the radio access bearer can be higher than a processing load associated with the handover.

In this regard, an embodiment provides a communication control apparatus and a base station which are capable of reducing the processing load in the core network.

A communication control apparatus according to an embodiment is used in a mobile communication system. The communication control apparatus includes: a controller configured to perform control related to a radio access bearer established between a user terminal and a serving gateway. The radio access bearer is configured with: a first bearer between the user terminal and a base station; and a second bearer between the base station and the serving gateway. The communication control apparatus is positioned on the second bearer. The controller is configured to maintain at least some sections of the second bearer without releasing, even when the first bearer is released.

In an embodiment, the second bearer is configured with: a first section between the base station and the communication control apparatus; and a second section between the communication control apparatus and the serving gateway. The controller is configured to maintain the second section without releasing, even when the first bearer is released.

In an embodiment, the controller is configured to maintain the second section without releasing, by holding a tunnel endpoint identifier of the second section in association with an identifier of the user terminal.

In an embodiment, the communication control apparatus is configured to receive a bearer re-establishment request from the base station after the first bearer is released. The controller is configured to re-establish the second bearer by re-establishing the first section on the basis of the bearer re-establishment request.

In an embodiment, the controller is configured to transmit a bearer re-establishment response for establishing the first bearer to the base station on the basis of the bearer re-establishment request. The radio access bearer is re-established by a second bearer re-established by the communication control apparatus and the first bearer established by the base station.

In an embodiment, the communication control apparatus is configured to accommodate a plurality of base stations. When the communication control apparatus receives data destined for the user terminal from the serving gateway, the controller is configured to transmit a paging request for requesting paging of the user terminal to the plurality of base stations. When the paging is successfully performed in a specific base station among the plurality of base stations, the controller is configured to re-establish the second bearer by re-establishing the first section with the specific base station.

In an embodiment, the controller is configured to transmit, to the specific base station, a bearer establishment request for establishing the first bearer. The radio access bearer is re-established by a second bearer re-established by the communication control apparatus and the first bearer established by the specific base station.

In an embodiment, when the paging fails in all of the plurality of base stations, the controller is configured to transmit a release notification of the radio access bearer to the mobility management apparatus, and return the data to the serving gateway.

A base station according to an embodiment is used in a mobile communication system. The base station includes a controller configured to perform control related to a radio access bearer established between the user terminal and a serving gateway. The radio access bearer is configured with: a first bearer between the user terminal and the base station; and a second bearer between the base station and the serving gateway. A communication control apparatus is positioned on the second bearer. The controller is configured to transmit a bearer re-establishment request to the communication control apparatus when a connection request is received from the user terminal after the first bearer is released.

In an embodiment, the controller is configured to establish the first bearer with the user terminal, when the base station receives a bearer re-establishment response from the communication control apparatus in response to the bearer re-establishment request.

In an embodiment, when the base station receives a paging request requesting paging of the user terminal from the communication control apparatus, the controller is configured to perform paging of the user terminal. When paging of the user terminal is successfully performed, the controller is configured to transmit a positive paging response to the communication control apparatus in response to the paging request.

Embodiment (Mobile Communication System)

Hereinafter, an embodiment in which the present application is applied to an LTE system which is a mobile communication system based on the 3GPP standard will be described. FIG. 1 is a diagram illustrating a configuration of an LTE system according to an embodiment.

The LTE system according to the embodiment includes an evolved-UMTS terrestrial radio access network (E-UTRAN) 10, an evolved packet core (EPC) 20, and user equipment (UE) 100 as illustrated in FIG. 1. In the embodiment, the UE 100 corresponds to a user terminal. The E-UTRAN 10 corresponds to a radio access network. The EPC 20 corresponds to a core network.

The E-UTRAN 10 includes an evolved Node-B (eNB 200) and a radio access network gateway (RAN GW) 300. In the embodiment, the eNB 200 corresponds to a base station. The RAN GW 300 corresponds to a communication control apparatus.

The eNB 200 manages a cell and performs radio communication with the UE 100 in a radio resource control (RRC) connected mode in its own cell. The eNB 200 has a radio resource management (RRM) function, a function of routing user data (hereinafter referred to simply as "data"), a measurement control function for mobility control/scheduling, and the like. In addition to a term indicating a minimum unit of a radio communication area, "cell" is also used as a term indicating a function performing radio communication with the UE 100.

FIG. 1 illustrates an example in which an eNB 200-1 which is a macro cell base station that manages a macro cell, an eNB 200-2 which is a small cell base station that manages a small cell #1, and an eNB 200-3 serving as a small cell base station that manages a small cell #2 are installed. The small cell #1 and the small cell #2 are arranged in the macro cell. The system capacity can be increased by arranging the small cells in the macro cell.

The RAN GW 300 accommodates a plurality of eNBs 200 (the eNB 200-2 and the eNBs 200-3). Specifically, the RAN GW 300 is connected to the eNB 200 via an S1 interface. The S1 interface includes an S1-U interface corresponding to a user plane (U plane) dealing with data and an S1-MME interface corresponding to a control plane (C plane) dealing with a control signal (signaling).

The EPC 20 includes a mobility management entity (MME) 500, a serving-gateway (S-GW) 400, and a PDN-gateway (P-GW) 600. In the embodiment, the MME 500 corresponds to the mobility management apparatus. The S-GW 400 is a core network apparatus corresponding to the U plane and performs data transfer control and the like. The MME 500 is a core network apparatus corresponding to the C plane, and performs various kinds of mobility control and the like for the UE 100. The P-GW 600 functions as a connection point with the Internet or the like which is an external network.

In FIG. 1, an example in which the eNB 200-1 is connected with the S-GW 400 via the S1-U interface and connected with the MME 500 via the S1-MME interface is illustrated. Further, an example in which the RAN GW 300 is connected with the S-GW 400 via the S1-U interface and connected with the MME 500 via the S1-MME interface is illustrated. Furthermore, an example in which the S-GW 400 is connected with the P-GW 600 via an S5/S8 interface is illustrated.

The UE 100 is a mobile communication apparatus. When there is an RRC connection between the UE 100 and the eNB 200, the UE 100 is in the RRC connected mode, and the UE 100 is in the RRC idle mode otherwise. The UE 100 in the RRC connected mode performs the handover for switching the serving cell in accordance with the movement. The UE 100 in the RRC idle mode performs cell reselection for switching the serving cell in accordance with the movement. In FIG. 1, an example in which the serving cell of the UE 100 is the small cell #1 is illustrated.

(Radio Access Bearer)

Figure 2:
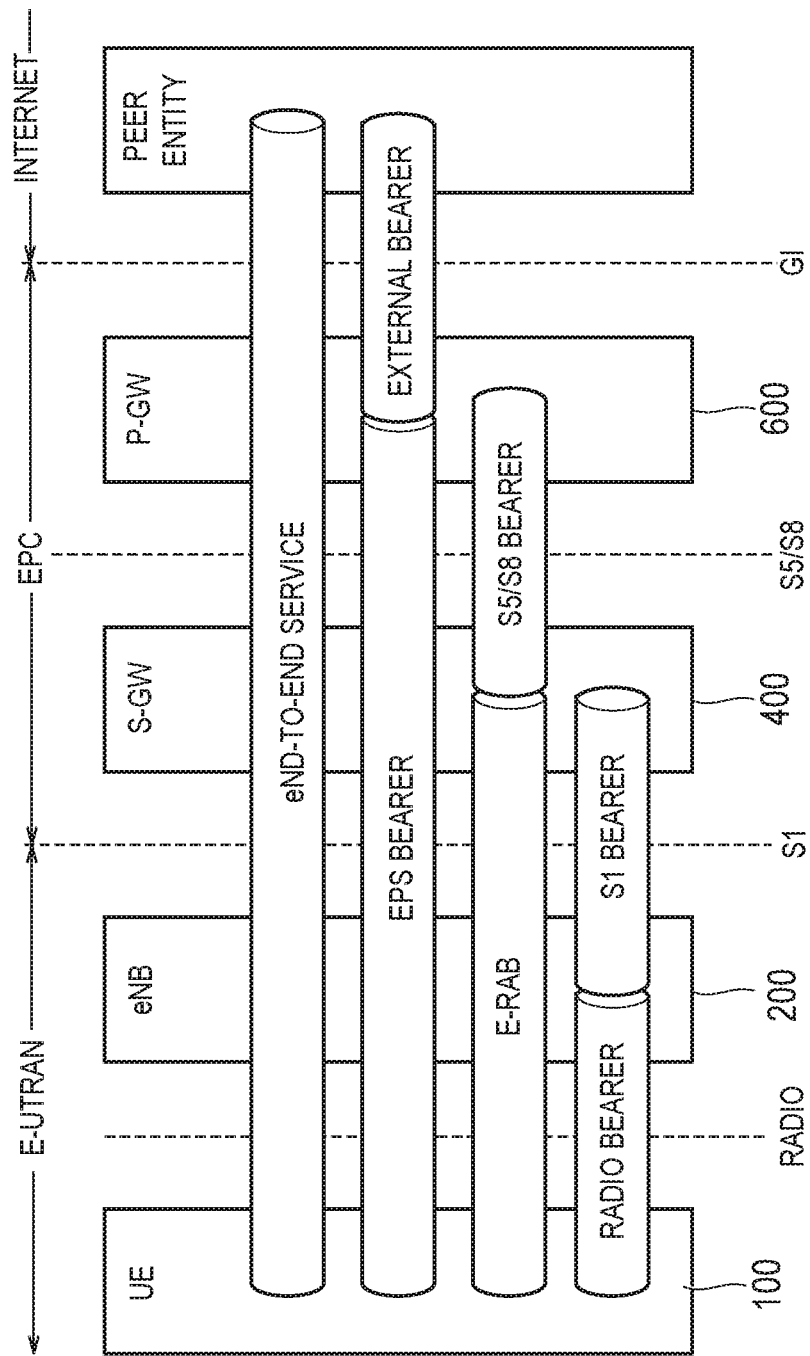
FIG. 2 is a diagram for describing a radio access bearer (E-RAB) according to the embodiment.

An E-UTRAN radio access bearer (E-RAB) will be described below. The E-RAB is equivalent to a radio access bearer. FIG. 2 is a diagram for describing the E-RAB.

The UE 100 performs communication with a counterpart apparatus (Peer Entity) on the Internet as illustrated in FIG. 2. Here, data transmitted and received by the UE 100 is carried by an evolved packet system (EPS) bearer between the UE 100 and the P-GW 600 and an external bearer between the P-GW 600 and the Internet.

The EPS bearer is configured with an E-RAB between the UE 100 and the S-GW 400 and an S5/S8 bearer between the S-GW 400 and the P-GW 600. The S5/S8 bearer is established on the S5/S8 interface. When the E-RAB is present, the E-RAB and the EPS bearer have a one to one correspondence relation. The S-GW 400 stores a correspondence relation between the S5/S8 bearer and the S1 bearer.

The E-RAB is configured with a data radio bearer (Radio Bearer) between the UE 100 and the eNB 200 and an S1 bearer between the eNB 200 and the S-GW 400. In the embodiment, the data radio bearer corresponds to a first bearer, and the S1 bearer corresponds to a second bearer.

The S1 bearer is established on the S1-U interface. When there is the data radio bearer, the data radio bearer and the EPS bearer/E-RAB have a one-to-one correspondence relation. The eNB 200 stores a correspondence relation between the S1 bearer and the data radio bearer.

In a common E-RAB establishment procedure, the MME 500 transmits an E-RAB establishment request to the eNB 200. In response to reception of the E-RAB establishment request from the MME 500, the eNB 200 establishes the data radio bearer and the S1 bearer, and transmits an E-RAB establishment response to the MME 500.

Further, in a common E-RAB release procedure, the MME 500 transmits an E-RAB establishment instruction to the eNB 200. In response to reception of the E-RAB release instruction from the MME 500, the eNB 200 releases the data radio bearer and the S1 bearer, and transmits an E-RAB release completion notification to the MME 500.

When the eNB 200 releases the RRC connection with the UE 100, the E-RAB is released. Then, when the RRC connection with the UE 100 is established, the E-RAB is established. Signaling occurs between the eNB 200 and the MME 500 as the E-RAB is established and released. Accordingly, the processing load on the MME 500 may increase.

(Communication Control Apparatus)

Figure 3:
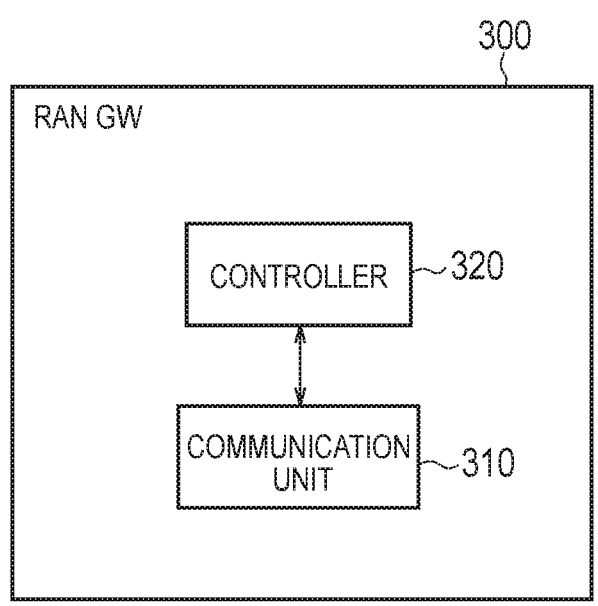
FIG. 3 is a block diagram of a communication control apparatus (a RAN GW) according to the embodiment.

Next, the RAN GW 300 (communication control apparatus) according to an embodiment will be described. The RAN GW 300 is positioned on the S1 bearer between the eNB 200 and the S-GW 400 (see FIG. 1). FIG. 3 is a block diagram of the RAN GW 300 according to an embodiment.

The RAN GW 300 includes a communication unit 310 and a controller 320 as illustrated in FIG. 3. The communication unit 310 is used for communication on the S1 interface under the control of the controller 320. The controller 320 performs various kinds of control in the RAN GW 300. The controller 320 includes a processor and a memory. The memory stores programs executed by the processor and information used for processes performed by the processor. A central processing unit (CPU) which executes the programs stored in the memory and performs various kinds of processes is included. The processor executes various kinds of processes to be described later.

In an embodiment, the controller 320 performs control related to the E-RAB established between the UE 100 and the S-GW 400. Even when the data radio bearer is released, the controller 320 maintains at least some sections of the S1 bearer without releasing them. In other words, the controller 320 maintains at least some sections of the S1 bearer for the UE 100 that has transitioned to the RRC idle mode without releasing them.

The S1 bearer is configured with a first section between the eNB 200 and the RAN GW 300 and a second section between the RAN GW 300 and the S-GW 400. Even when the data radio bearer is released, the controller 320 maintains the second section without releasing it.

The controller 320 holds the second section without releasing it by holding a tunnel endpoint identifier of the second section in association with an identifier of the UE 100. The tunnel endpoint identifier is, for example, a GPRS tunneling protocol tunnel endpoint ID (GTP TEID). The identifier of UE 100 may be an MME UE S1AP ID, an international mobile subscriber identity (IMSI), an international mobile equipment identity (IMEI), a cell radio network temporary identity (C-RNTI), a globally unique temporary identity (GUTI), or an IP address. Further, the controller 320 holds an identifier of the eNB 200 (the eNBs 200-2 and eNB 200-3) (and a cell identifier) under the RAN GW 300. The identifier of the eNB 200 may be an eNB UE S1AP ID. The controller 320 acquires such information before a timing at which the UE 100 releases the RRC connection. Alternatively, the controller 320 may acquire such information from the eNB 200 when the UE 100 releases the RRC connection.

The controller 320 may manage a timer corresponding to a period in which the second section of the S1 bearer is maintained. In this case, the controller 320 activates the timer when the data radio bearer is released, maintains the second section of the S1 bearer until the timer expires, and releases the second section when the timer expires.

In a first bearer re-establishment sequence (which will be described later in detail), the RAN GW 300 receives a bearer re-establishment request from the eNB 200 after the data radio bearer is released. The controller 320 re-establishes the S1 bearer by re-establishing the first section on the basis of the bearer re-establishment request. Further, the controller 320 transmits a bearer re-establishment response for establishing the data radio bearer to the eNB 200 on the basis of the bearer re-establishment request. The E-RAB is re-established by the S1 bearer re-established by the RAN GW 300 and the data radio bearer established by the eNB 200.

On the other hand, in a second bearer re-establishment sequence (which will be described later in detail), when the RAN GW 300 receives data destined for the UE 100 from the S-GW 400, and the controller 320 transmits a paging request for requesting paging of the UE 100 to a plurality of eNBs 200 (the eNB 200-2 and the eNB 200-3). When the paging is successfully performed in a specific eNB 200 among a plurality of eNBs 200, the controller 320 re-establishes the S1 bearer by re-establishing the first section with the specific eNB 200. Then, the controller 320 transmits a bearer establishment request for establishing the data radio bearer to the specific eNB 200. The E-RAB is re-established by the S1 bearer re-established by the RAN GW 300 and the data radio bearer established by the specific eNB 200. When the paging fails in all of a plurality of eNBs 200, the controller 320 transmits an E-RAB release notification to the MME 500, and returns data to the S-GW 400.

(Base Station)

Figure 4:
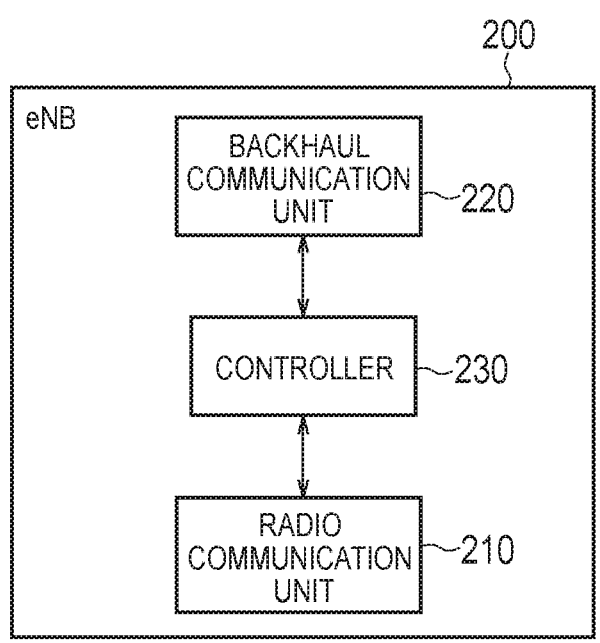
FIG. 4 is a block diagram of a base station (an eNB) according to the embodiment.

FIG. 4 is a block diagram of the eNB 200 (base station). The eNB 200 includes a radio communication unit 210, a backhaul communication unit 220, and a controller 230 as illustrated in FIG. 4.

The radio communication unit 210 is used for communication with the UE 100 under the control of the controller 230. The backhaul communication unit 220 is used for communication on the S1 interface under the control of the controller 230. The controller 230 performs various kinds of control in the eNB 200. The controller 230 includes a processor and a memory. The memory stores programs executed by the processor and information used for processes performed by the processor. The processor includes a baseband processor that performs modulation/demodulation, encoding/decoding, and the like of a baseband signal and a CPU that executes the programs stored in the memory and performs various kinds of processes. The processor executes various kinds of processes to be described later.

In an embodiment, the controller 230 controls the E-RAB established between the UE 100 and the S-GW 400.

In the first bearer re-establishment sequence, upon receiving a connection request from the UE 100 after the data radio bearer is released, the controller 230 transmits the bearer re-establishment request to the RAN GW 300 positioned on the S1 bearer. Then, when the eNB 200 receives the bearer re-establishment response to the bearer re-establishment request from the RAN GW 300, the controller 230 establishes the data radio bearer with the UE 100.

On the other hand, in the second bearer re-establishment sequence, when the eNB 200 receives the paging request for requesting paging of the UE 100 from the RAN GW 300, the controller 230 performs paging of the UE 100. When paging of the UE 100 is successfully performed, the controller 230 transmits a positive paging response to the RAN GW 300 to in response to the paging request.

(First Bearer Re-Establishment Sequence)

The first bearer re-establishment sequence according to an embodiment will be described below. FIG. 5 is a sequence diagram illustrating the first bearer re-establishment sequence according to an embodiment. In an initial state of FIG. 5, the UE 100 is in the RRC idle mode, and the data radio bearer is released. However, the second section of the S1 bearer (the section between the RAN GW 300 and the S-GW 400) is not released but maintained (step S101).

As illustrated in FIG. 5, in step S102, the UE 100 transmits a connection request (RRC Connection Request) message to the eNB 200.

In step S103, the eNB 200 transmits a bearer re-establishment request (E-RAB Resume Request) message to the RAN GW 300 in response to reception of the "RRC Connection Request" message. The "E-RAB Resume Request" message includes, for example, the identifier of the UE 100, the "MME UE S1AP ID," the "eNB UE S1AP ID," and a NAS-PDU. Here, it should be noted that the eNB 200 does not perform signaling destined for the MME 500.

In step S104, in response to the reception of the "E-RAB Resume Request" message, the RAN GW 300 checks whether or not the S1 bearer of the corresponding UE 100 is maintained. For example, the RAN GW 300 searches for a combination of the GTP TEID and the UE ID corresponding thereto from combinations of the held GTP TEIDs and the identifiers of the UEs 100.

When the S1 bearer of the UE 100 is not maintained (No in step S104), the RAN GW 300 transmits a failure notification (E-RAB Resume Failure) message to the eNB 200. In response to reception of the "E-RAB Resume Failure" message, the eNB 200 transmits a bearer establishment (E-RAB Setup) message to the MME 500. A subsequent operation is similar to that in the general E-RAB establishment procedure. Alternatively, the failure notification message may be transmitted from the RAN GW 300 to the MME 500. In this case, the E-RAB may be established when the MME 500 transmits the bearer establishment (E-RAB Setup) message or the E-RAB establishment request to the eNB 200.

On the other hand, when the S1 bearer of the UE 100 is maintained (Yes in step S104), in step S105, the RAN GW 300 transmits the bearer re-establishment response (E-RAB Resume Response) message for establishing the data radio bearer to the eNB 200 Send. The "E-RAB Resume Response" message includes the "MME UE S1AP ID," the "eNB UE S1AP ID," an "UE Aggregate Maximum Bit Rate," an "E-RAB to be Setup List," and the like. The eNB 200 receives the "E-RAB Resume Response" message.

In step S106, the RAN GW 300 and the eNB 200 re-establish the first section of the S1 bearer (the section between the eNB 200 and the RAN GW 300). The first section may be a new virtual bearer. The RAN GW 300 associates the first section of S1 bearer with the second section that is being maintained.

In step S107, the eNB 200 transmits an RRC reconfiguration (RRC Connection Reconfiguration) message for establishing the data radio bearer to the UE 100. The UE 100 receives the "RRC Connection Reconfiguration" message.

In step S108, the eNB 200 and the UE 100 establish the data radio bearer. The eNB 200 associates the established data radio bearer with the S1 bearer. Accordingly, the E-RAB between the UE 100 and the S-GW 400 is re-established (restored).

(Second Bearer Re-Establishment Sequence)

Next, a second bearer re-establishment sequence according to the embodiment will be described. FIG. 6 is a sequence diagram illustrating the second bearer re-establishment sequence according to the embodiment. In the initial state of FIG. 6, the UE 100 is in the RRC idle mode, and the data radio bearer is released. However, the second section of the S1 bearer (the section between the RAN GW 300 and the S-GW 400) is not released but maintained (step S201).

As illustrated in FIG. 6, in step S202, the S-GW 400 transmits data destined for the UE 100 (that is, downlink data) to the RAN GW 300. The RAN GW 300 receives the data. In response to reception of the downlink data, the RAN GW 300 searches for a combination of the GTP TEID and the UE ID corresponding thereto from combinations of the held GTP TEIDs and the UE IDs. However, it should be noted that the RAN GW 300 has no information about an eNB 200 having a cell in which the UE 100 exists.

In step S203, the RAN GW 300 transmits a paging request (RAN Paging Request) message for requesting paging of the UE 100 to a plurality of eNB 200 (the eNB 200-2 and the eNB 200-3). The "RAN Paging Request" message includes the identifier (UE ID) of the UE 100.

In step S204, a plurality of eNBs 200 transmits a paging (RAN Paging) message in its own cell in response to reception of the "RAN Paging Request" message. Here, the UE 100 is assumed to exist in a cell of one eNB 200 (a specific eNB 200) among a plurality of eNBs 200.

In step S205, the UE 100 transmits a connection request (RRC Connection Request) message to the specific eNB 200 in response to reception of the "RAN Paging" message.

In step S206, the specific eNB 200 transmits a paging response (RAN Paging Response) message to the RAN GW 300 in response to reception of the "RRC Connection Request" message. The "RAN Paging Response" message includes the identifier of the UE, the "MME UE S1AP ID," the "eNB UE S1AP ID," and the like. Here, it should be noted that the specific eNB 200 does not perform signaling destined for the MME 500.

In step S207, the RAN GW 300 transmits a bearer re-establishment instruction (E-RAB Resume Command) message for establishing the data radio bearer to the specific eNB 200. The "E-RAB Resume Command" message includes the "MME UE S1AP ID," the "eNB UE S1AP ID," the "UE Aggregate Maximum Bit Rate," the "E-RAB to be Setup List," and the like. The specific eNB 200 receives the "E-RAB Resume Command" message.

In step S208, the RAN GW 300 and the specific eNB 200 re-establish the first section of the S1 bearer (the section between the eNB 200 and the RAN GW 300). The first section may be a new virtual bearer. The RAN GW 300 associates the first section of S1 bearer with the second section that is being maintained.

In step S209, the specific eNB 200 transmits a bearer re-establishment completion (E-RAB Resume Complete) message to the RAN GW 300. The "E-RAB Resume Complete" message includes the "MME UE S1AP ID," the "eNB UE S1AP ID," the "E-RAB Setup List," and the like.

In step S210, the specific eNB 200 transmits an RRC reconfiguration (RRC Connection Reconfiguration) message for establishing the data radio bearer to the UE 100. The UE 100 receives the "RRC Connection Reconfiguration" message.

In step S211, the specific eNB 200 and the UE 100 establish the data radio bearer. The specific eNB 200 associates the established data radio bearer with the S1 bearer. Accordingly, the E-RAB between the UE 100 and the S-GW 400 is re-established (restored).

In this sequence, that the UE 100 is assumed to be exist in a cell of any one eNB 200 (the specific eNB 200) among a plurality of eNBs 200 subordinate to the RAN GW 300. However, when the UE 100 does not exist in, the RAN GW 300 detects a timeout of the "RAN Paging Response" message and performs a next operation.

Specifically, the RAN GW 300 determines that the paging has failed in all of a plurality of eNBs 200, transmits the E-RAB release notification (E-RAB Release Indication) message to the MME 500, and returns (forwards) the downlink data to the S-GW 400.

Conclusion of Embodiment

As described above, even when the data radio bearer is released, the RAN GW 300 maintains at least some sections of the S1 bearer without releasing them. Accordingly, the RAN GW 300 can control the establishment of the E-RAB on the basis of the maintained S1 bearer instead of the MME 500. Therefore, when the E-RAB is established, signaling between the eNB 200 and the MME 500 can be suppressed, and thus the processing load in the MME 500 can be reduced.

Other Embodiments

In the above embodiment, the example in which the RAN GW 300 accommodates a plurality of eNBs 200 has been described. However, the RAN GW 300 may accommodate only one eNB 200. Further, the S1-MME interface may not be set between the RAN GW 300 and the eNB 200. The RAN GW 300 may be installed at the boundary between the E-UTRAN 10 and the EPC 20.

In the above embodiment, the LTE system has been described as an example of the mobile communication system. However, the present application is not limited to the LTE system. The present application may be applied to systems other than the LTE system.

INDUSTRIAL APPLICABILITY

The present application is useful in the field of communication.

The invention claimed is:

1. A communication control apparatus used in a mobile communication system, comprising:
    a controller configured to perform control related to a radio access bearer established between a user terminal and a serving gateway, and
    a receiver, wherein
    the radio access bearer is configured with: a first bearer between the user terminal and a base station; and a second bearer between the base station and the serving gateway,
    the second bearer is configured with: a first section between the base station and the communication control apparatus; and a second section between the communication control apparatus and the serving gateway,
    the controller is configured to maintain the second section of the second bearer without releasing, even when the first bearer is released,
    the communication control apparatus is configured to accommodate a plurality of base stations and to communicate to a Mobility Management Entity (MME) that manages mobility of the user terminal, and
    when the receiver receives data destined for the user terminal from the serving gateway, the controller is configured to transmit a paging request for requesting paging of the user terminal to the plurality of base stations.

2. The communication control apparatus according to claim 1, wherein
    the controller is configured to maintain the second section without releasing, by holding a tunnel endpoint identifier of the second section in association with an identifier of the user terminal.

3. The communication control apparatus according to claim 1, wherein
    the communication control apparatus is configured to receive a bearer re-establishment request from the base station after the first bearer is released, and
    the controller is configured to re-establish the second bearer by re-establishing the first section on the basis of the bearer re-establishment request.

4. The communication control apparatus according to claim 3, wherein
    the controller is configured to transmit a bearer re-establishment response for establishing the first bearer to the base station on the basis of the bearer re-establishment request, and
    the radio access bearer is re-established by the second bearer re-established by the communication control apparatus and the first bearer established by the base station.

5. The communication control apparatus according to claim 1, wherein,
    when the paging is successfully performed in a specific base station among the plurality of base stations, the controller is configured to re-establish the second bearer by re-establishing the first section with the specific base station.

6. The communication control apparatus according to claim 5, wherein
    the controller is configured to transmit, to the specific base station, a bearer establishment request for establishing the first bearer, and
    the radio access bearer is re-established by a second bearer re-established by the communication control apparatus and the first bearer established by the specific base station.

7. The communication control apparatus according to claim 5, wherein,
 when the paging fails in all of the plurality of base stations, the controller is configured to transmit a release notification of the radio access bearer to a mobility management apparatus, and return the data to the serving gateway.

8. A communication method for a communication control apparatus used in a mobile communication system, the communication control apparatus configured to accommodate a plurality of base stations and to communicate to a Mobility Management Entity (MME) that manages mobility of a user terminal, the communication method comprising:
 establishing a radio access bearer between the user terminal and a serving gateway, wherein
  the radio access bearer is configured with: a first bearer between the user terminal and a base station; and a second bearer between the base station and the serving gateway, and
  the second bearer is configured with: a first section between the base station and the communication control apparatus; and a second section between the communication control apparatus and the serving gateway;
 maintaining the second section of the second bearer without releasing, even when the first bearer is released; and
 when receiving data destined for the user terminal from the serving gateway, transmitting a paging request for requesting paging of the user terminal to the plurality of base stations.

* * * * *